United States Patent
R et al.

(10) Patent No.: US 10,846,110 B2
(45) Date of Patent: Nov. 24, 2020

(54) USER INTERFACE USAGE MEASUREMENT AND USER INTERFACE DESIGN USING MACHINE LEARNING

(71) Applicant: SAP SE, Walldorf (DE)

(72) Inventors: Jai Vignesh R, Chennai (IN); Rajendra Kumar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/149,472

(22) Filed: Oct. 2, 2018

(65) Prior Publication Data

US 2020/0104148 A1    Apr. 2, 2020

(51) Int. Cl.
*G06F 9/451* (2018.01)
*G06F 3/16* (2006.01)
*G06F 11/34* (2006.01)
*G06N 20/00* (2019.01)

(52) U.S. Cl.
CPC .............. *G06F 9/453* (2018.02); *G06F 3/167* (2013.01); *G06F 11/3438* (2013.01); *G06N 20/00* (2019.01)

(58) Field of Classification Search
CPC ...... G06F 9/453; G06F 3/167; G06F 11/3438; G06N 20/00
See application file for complete search history.

(56) References Cited

U.S. PATENT DOCUMENTS

| | | | | |
|---|---|---|---|---|
| 8,856,670 B1 * | 10/2014 | Thakur | ................... | G06F 9/451 715/765 |
| 2010/0095208 A1 * | 4/2010 | White | ................. | G06F 11/3438 715/704 |
| 2015/0067531 A1 * | 3/2015 | Adimatyam | .......... | G06F 3/0481 715/745 |
| 2017/0131867 A1 * | 5/2017 | Anbil Parthipan | .... | G06N 5/022 |
| 2019/0108494 A1 * | 4/2019 | Nelson | ................... | G06N 20/00 |
| 2020/0007634 A1 * | 1/2020 | Xie | ..................... | G06Q 30/0282 |

OTHER PUBLICATIONS

Wikipedia, "Cosine similarity", https://en.wikipedia.org/wiki/Cosine_similarity, archived: Aug. 14, 2017, https://web.archive.org/web/20170814132345/https://en.wikipedia.org/wiki/Cosine_similarity (Year: 2017).*

* cited by examiner

*Primary Examiner* — Seth A Silverman
(74) *Attorney, Agent, or Firm* — Sterne, Kessler, Goldstein & Fox P.L.L.C.

(57) ABSTRACT

Disclosed herein are system, method, and computer program product embodiments for measuring graphical user interface (GUI) usage, generating visual depictions of the GUI usage, and providing GUI modification recommendations based on the GUI usage. A user interface (UI) usage measurement system may monitor user interactions with an application from one or more user devices. The UI usage measurement system may data such as button clicks or other icon interactions on a GUI. After aggregating this information, the UI usage measurement system may apply machine learning techniques to determine a GUI object recommendation. The recommendation may include the movement of one or more GUI objects to different locations so that the user may more quickly access GUI objects that are more heavily utilized. In this manner, the UI usage measurement system may modify the GUI used by a particular user to access elements of an application.

20 Claims, 15 Drawing Sheets

PROCESS MONITORING

Last Refresh: 27.03.2018 15:05:36

Metric Detail For Test Process 1

Navigate To ↓

| Monitoring Object → Metric → Variant | System | Status | Last Date and Timestamp |
|---|---|---|---|
| > MUSTA 101 | FBT:200 | X | 26.03.2018 – 17:43:11 |
| > ABAP Dumps by user today | FBT:200 | X | 27.03.2018 – 11:30:59 |
| > Application Log - Test Threshold | FBT:200 | X | 27.03.2018 – 11:30:59 |
| > CRM Service Documents | FBT:200 | ■ | 27.03.2018 – 11:32:38 |
| > CCMS Monitor | FBT:200 | ■ | 27.03.2018 – 11:32:38 |
| > Dia Perf | | | |

PROCESS MONITORING

Last Refresh: 27.03.2018 15:05:36

305C

Metric Detail For Test Process 1

| Monitoring Object → Metric → Variant | System | Status | Last Date and Timestamp |
|---|---|---|---|
| > MUSTA 101 | FBT:200 | X | 26.03.2018 – 17:43:11 |
| > ABAP Dumps by user today | FBT:200 | X | 27.03.2018 – 11:30:59 |
| > Application Log - Test Threshold | FBT:200 | X | 27.03.2018 – 11:30:59 |
| > CRM Service Documents | FBT:200 | ■ | 27.03.2018 – 11:32:38 |
| > CCMS Monitor | FBT:200 | ■ | 27.03.2018 – 11:32:38 |
| > Dia Perf | FBT:200 | | |

Navigate To ↓ — 325
Job Monitoring — 330
Interface Channel Monitoring — 335

FIG. 3D

USER INTERFACE USAGE MEASUREMENT AND USER INTERFACE DESIGN USING MACHINE LEARNING

BACKGROUND

As users continue to use computers and software applications, their interactions with user interfaces (UI) or graphical user interfaces (GUI) also increase. These interactions may include manipulating buttons or icons on a GUI to execute software commands or to navigate to different views of an application. This navigation may occur between different software applications or between different pages of an application. Applications often provide fixed button locations or fixed designs for the GUI. Users may ignore certain buttons while relying heavily on other buttons. In this manner, the designed GUI layout may be inefficient for certain users and may require users to navigate through many GUI pages before reaching the desired content.

BRIEF DESCRIPTION OF THE DRAWINGS

The accompanying drawings are incorporated herein and form a part of the specification.

FIG. 3C depicts a block diagram of a GUI displaying a third page of the application, according to some embodiments.

FIG. 3D depicts a block diagram of a GUI displaying a button interaction, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1A:
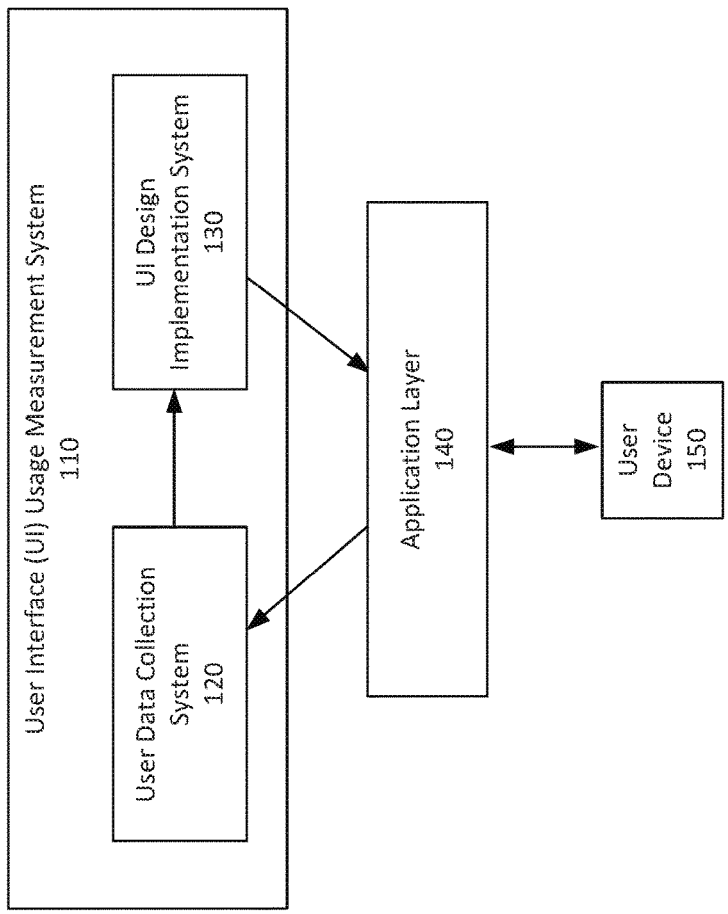
FIG. 1A depicts a block diagram of a user interface (UI) usage measurement environment with a single user device, according to some embodiments.

Provided herein are system, apparatus, device, method and/or computer program product embodiments, and/or combinations and sub-combinations thereof, for measuring graphical user interface (GUI) usage, generating visual depictions of the GUI usage, and providing GUI modification recommendations based on the GUI usage.

A user interface (UI) usage measurement system may monitor user interactions with an application. The UI usage measurement system may gather information or statistics related to user interactions such as button clicks or other icon interactions on a GUI. These interactions may be gathered from one or more different user devices corresponding to one or more different users. Using this information, the UI usage measurement system may apply machine learning techniques to determine a recommendation for a particular user. The recommendation may include the movement of one or more GUI objects to different locations so that the user may more quickly access GUI objects that are more heavily utilized. These movements may occur across pages or different GUI views of a displayed application. In this manner, the UI usage measurement system may modify the GUI used by a particular user to access elements of an application.

The UI usage measurement system may be implemented in a networked and/or cloud-based computing system. The UI usage measurement system may monitor interactions from multiple users or user devices. Using this information, the UI usage measurement system may aggregate interactions with particular applications and compare interactions from many different users. The UI usage measurement system may apply machine learning techniques to this information to identify patterns and/or to generate recommendations for GUI object movement based on the identified patterns. The UI usage measurement system may be integrated with a customizable UI framework and/or may be UI technology agnostic. In this manner, the UI usage measurement system may be integrated with any technology providing GUI views of an application.

The UI usage measurement system may identify a characteristic of a particular user and determine efficient GUI object placement based on matching characteristics of other users. For example, an IT administrator may use a particular button to access an application. This button may be located on a page designated "Page C." To access the button, by default, a user may navigate to Page C by interacting with a first button on Page A that leads to Page B and then a second button on Page B to access Page C. Most users may not utilize the button located on Page C, but IT administrators may more frequently use the button relative to other users. Recognizing that the user is an IT administrator, the UI usage measurement system may recommend that moving the button from Page C to Page A would be more efficient and/or may allow the IT administrator to more quickly access the button. The UI usage measurement system may have gathered interaction information from other IT administrator interactions to identify this pattern and subsequently provide the recommendation to a new IT administrator. In this manner, the UI usage measurement system may group a subset of the users using a common user profile characteristic.

Similarly, in an embodiment, the UI usage measurement system may identify a GUI object or button that is not frequently used or where the usage falls below a particular threshold. In this case, the UI usage measurement system may generate a recommendation suggesting that the GUI object not be loaded. The UI usage measurement system may provide combination of recommendations based on usage and/or lack of usage of one or more GUI objects.

In this manner, the UI usage measurement system may collect information pertaining to a particular user and/or a number of users to generate a GUI object recommendation. The UI usage measurement system may also interface with various user devices via an application programming interface (API) to reduce complexity in the information collection process. Further, using an API may allow for greater scalability to support multiple users as well as multiple applications.

The UI usage measurement system may also be configured to provide a visualization of the interaction information gathered. This visualization may aid designers with UI creation and design. An example of this visualization may be a heat map correlating areas of the GUI with usage statistics. For example, the heat map may use a particular visual indicator, such as a color, indicating a high amount of interactions while utilizing a different visual indicator to indicate a lower amount of interactions. The visual indicator may be a continuous spectrum and/or may include discrete categories. The determined visual indicators may be laid over the GUI so that designers or administrators may view the visual indicators.

These features of example embodiments will now be discussed in greater detail with respect to the corresponding figures.

FIG. 1A depicts a block diagram of a user interface (UI) usage measurement environment 100A with a single user device 150, according to some embodiments. UI usage measurement environment 100A may include UI usage measurement system 110, application layer 140 and user device 150.

UI usage measurement system 110 may be implemented using one or more processors, memory, databases, servers, routers, modems, antennae and/or hardware or software that may be configured to receive GUI interaction information from user device 150 and/or provide a GUI recommendation to user device 150. UI usage measurement system 110 may be implemented using computer system 600 described with reference to FIG. 6. UI usage measurement system 110 may operate on a computer network, such as, for example, a cloud computing platform or a software as a service platform. In an embodiment, UI usage measurement system 110 may be implemented on a local computing system. In an embodiment, UI usage measurement system 110 may be implemented on an intermediary system that pushes data from user device 150 to an external system.

UI usage measurement system 110 may instantiate one or more applications. UI usage measurement system 110 may be executed by another system that instantiates one or more applications. The applications may be software and/or Internet code accessible by user devices 150. The execution of these applications may be performed at application layer 140. Application layer 140 may represent the execution of particular software code. In an embodiment, application layer 140 may execute Internet software code, such as, for example JavaScript applications. A computer system implementing UI usage measurement system 110 may also implement application layer 140. The computer system may instantiate applications in application layer 140 and/or may generate GUI views so that user device 150 may display the GUI. Users using user device 150 may interact with the GUI to interact and/or manipulate the application.

UI usage measurement system 110 may monitor GUI interactions sent from user device 150 to application layer 140. To monitor the GUI interactions, UI usage measurement system 110 may use user data collection system 120. User data collection system 120 may be a component of UI usage measurement system 110 configured to receive GUI interactions from application layer 140 and/or user device 150. In an embodiment, an application implemented using application layer 140 may utilize an application programming interface (API) to pass information from the application to user data collection system 120. The data may be passed at predetermined time intervals and/or may be passed in response to receiving a user interaction. The application may be integrated using the same computing system or cloud system as UI usage measurement system 110 or the application may be executing on a computer system separate from UI usage measurement system 110. In either arrangement, UI usage measurement system 110 may collect information related to the user interactions.

Based on the collected information, UI usage measurement system 110 may generate a visualization of the collected interaction data and/or generate a recommendation regarding the location of a GUI object. To generate a visualization, user data collection system 120 may compile the data collected from user device 150 and/or may overlay the compiled data on various GUI views. For example, if UI usage measurement system 110 collects interaction data from a first page of an application, user data collection system 120 may generate a visualization of the interactions as an overlay over the first page. This visualization may be, for example, a heat map displaying the number of interactions recorded on various areas of the GUI.

UI usage measurement system 110 may use UI design implementation system 130 to generate a GUI object recommendation. UI design implementation system 130 may detect patterns based on the received interactions using machine learning techniques. In some embodiments, UI design implementation system 130 may combine the received interaction data with user information to generate the recommendation. For example, UI design implementation system 130 may use stored information user information from a local computer system and/or a cloud system. To generate the recommendation, UI design implementation system 130 may use and/or combine data including a user name, user age, user location, user persona, user authorizations or roles, the user navigation to other applications, the flow of the usage of features of an application, coordinates of a click or tap, scroll activity of the application, screen shots of pages of the applications, identifications of elements clicked or tapped, timestamps of the clicks or taps, Internet address and/or URLs of the application, network stack trace details (e.g., the time for a call to reach a gateway and/or HTTP roundtrip time information), resolution or zoom of a display screen, and/or other factors related to a user and/or the interactions. This data may be received and/or retrieved from various sources, such as, for example, UI usage measurement system 110 and/or user device 150.

Based on the collected interaction information, which may or may not be combined with other user data, UI design implementation system 130 may generate a GUI object recommendation. The recommendation may be generated using machine learning techniques to identify patterns. These patterns may identify heavily used portions of a particular GUI and/or the navigation path to access these portions. Based on the interaction data, UI design implementation system 130 may generate a recommendation to modify the particular locations of buttons to provide faster access. UI usage measurement system 110 may present this recommendation in the GUI so that the user may accept the recommendation if desired. If accepted, UI usage measurement system 110 may alter the GUI pages of the application for the particular user.

To illustrate a non-limiting example, a user using user device 150 may access a particular application executing on application layer 140 that uses tiles as graphical elements to display data or to enable software features. The tiles may be arranged in a grid configuration. The user may often use a tile located near the bottom of a particular GUI that may appear off-screen when the GUI is initially instantiated. In this manner, the user may need to scroll down to view the tile and/or may need to use a search bar to filter the tile. UI usage measurement system 110 may monitor these interactions and recognize that the user often interacts with the particular tile. UI usage measurement system 110 may use machine learning techniques and/or may use the techniques with predetermined rules to characterize the interaction. For example, UI usage measurement system 110 may set a threshold for the number of interactions within a particular time period. UI usage measurement system 110 may then provide a recommendation to the user to move the particular tile to a different location, such as, for example, to the top of the row and column. This suggestion may allow the user to more quickly access the tile based on its frequency of usage. The user may avoid the scrolling action in this manner. FIGS. 3A-3F also describe an example embodiment of this collection and recommendation process.

In this manner, UI usage measurement system 110 may modify one or more GUI displays or pages for a user to more efficiently arrange GUI objects for user access. UI usage measurement system 110 may generate these modifications based on pattern recognition of user interactions. While FIG. 1A describes an embodiment of a single user device 150, FIG. 1B describes and embodiment of supporting multiple user devices 150.

Figure 1B:
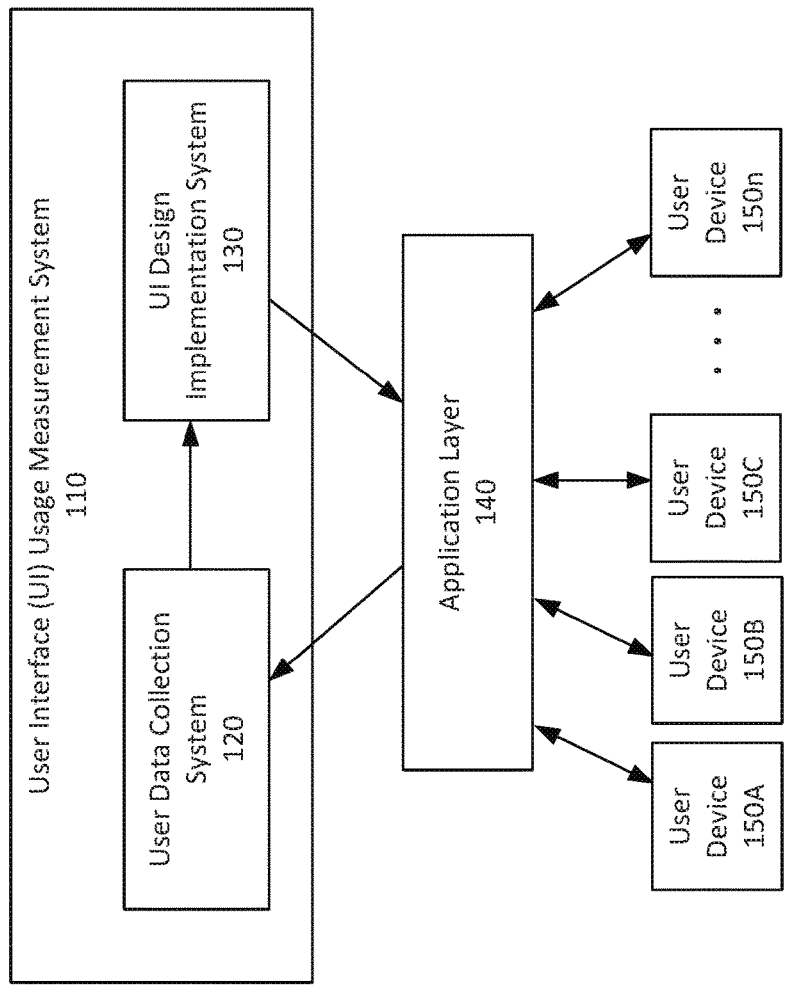
FIG. 1B depicts a block diagram of a UI usage measurement environment with multiple user devices, according to some embodiments.

FIG. 1B depicts a block diagram of a UI usage measurement environment 100B with multiple user devices 150, according to some embodiments. UI usage measurement environment 100B may include an embodiment of UI usage measurement system 110 that supports multiple user devices 150. UI usage measurement system 110 may monitor multiple user interactions across multiple applications in application layer 140. UI usage measurement system 110 may correlate data among multiple users to generate GUI object recommendations.

For example, user data collection system 120 may collect interaction data from multiple user devices 150. User data collection system 120 may collect interaction data from users using instances of a common application. While the application may utilize multiple pages and the user devices 150 may navigate to different pages, user data collection system 120 may collect data regarding each of these interactions and correlate the different interactions to the common GUI objects or GUI elements of the application. For example, if the application is a test application and includes a button to retrieve a job monitoring screen, user data collection system 120 may monitor users to determine the users that access the button. User data collection system 120 may also monitor the frequency of button access among different users. User data collection system 120 may correlate this usage with characteristics of a user. For example, user data collection system 120 may identify record information related to a user's occupational title. User data collection system 120 may then correlate recorded interactions with the occupational title. In this manner, user data collection system 120 may categorize the interactions based on this characteristic to identify a pattern of GUI object usage. Collecting interaction information from multiple users may allow UI usage measurement system 110 to use more data points in training a machine learning process to provide recommendations.

UI usage measurement system 110 may similarly generate a visualization of interactions collected from multiple user devices 150. The visualization may be a heat map representing aggregated interactions from the multiple user devices 150. UI usage measurement system 110 may generate an overlay view of this visualization on the GUI views. A UI or UX designer may view this heat map visualization to aid in designing GUI pages for applications.

UI usage measurement system 110 may also generate GUI object recommendations for a particular user using the collected interaction information from the particular user and/or the collected interaction information from among the multiple user devices 150. UI design implementation system 130 may aid in generating this recommendation.

UI design implementation system 130 may utilize the collected interaction information to generate a recommendation based on an identified user characteristic and/or based on identified interactions from a user. UI design implementation system 130 may generate a recommendation upon identifying a user characteristic such as, for example, an occupational title. In a non-limiting example, when a user accesses a particular application in application layer 140 monitored by UI usage measurement system 110, UI design implementation system 130 may identify that the user account is associated with the occupation of an IT administrator. Based on the interactions collected from other IT administrators accessing the application, UI design implementation system 130 may generate a recommendation to the new user. This recommendation may include changing the location of a particular GUI object. The particular GUI object may be one often used by IT administrators. In this manner, UI usage measurement system 110 may group a subset of the users using a common user profile characteristic. Moving the GUI object may lead to more efficient GUI navigation for the new user. UI design implementation system 130 may present the choice to the user to accept the change via a prompt on the GUI.

If the user accepts the change, UI usage measurement system 110 may modify the GUI and/or may store a record so that when the user accesses the application at a later time, UI usage measurement system 110 may automatically apply the modified version of the GUI. In this manner, the configuration may be saved in local memory executing the application and/or executing UI usage measurement system 110.

When generating the recommendation, UI usage measurement system 110 may utilize previously stored data and/or may continue to monitor interactions to further develop recommendations. For example, as a user interacts with GUI pages of an application, UI usage measurement system 110 may continue to monitor interactions and may continue to provide recommendations based on the user's interactions as well as the interactions of other users. In this manner, UI usage measurement system 110 may provide updates and/or recommendations based on continuous monitoring.

Figure 2:
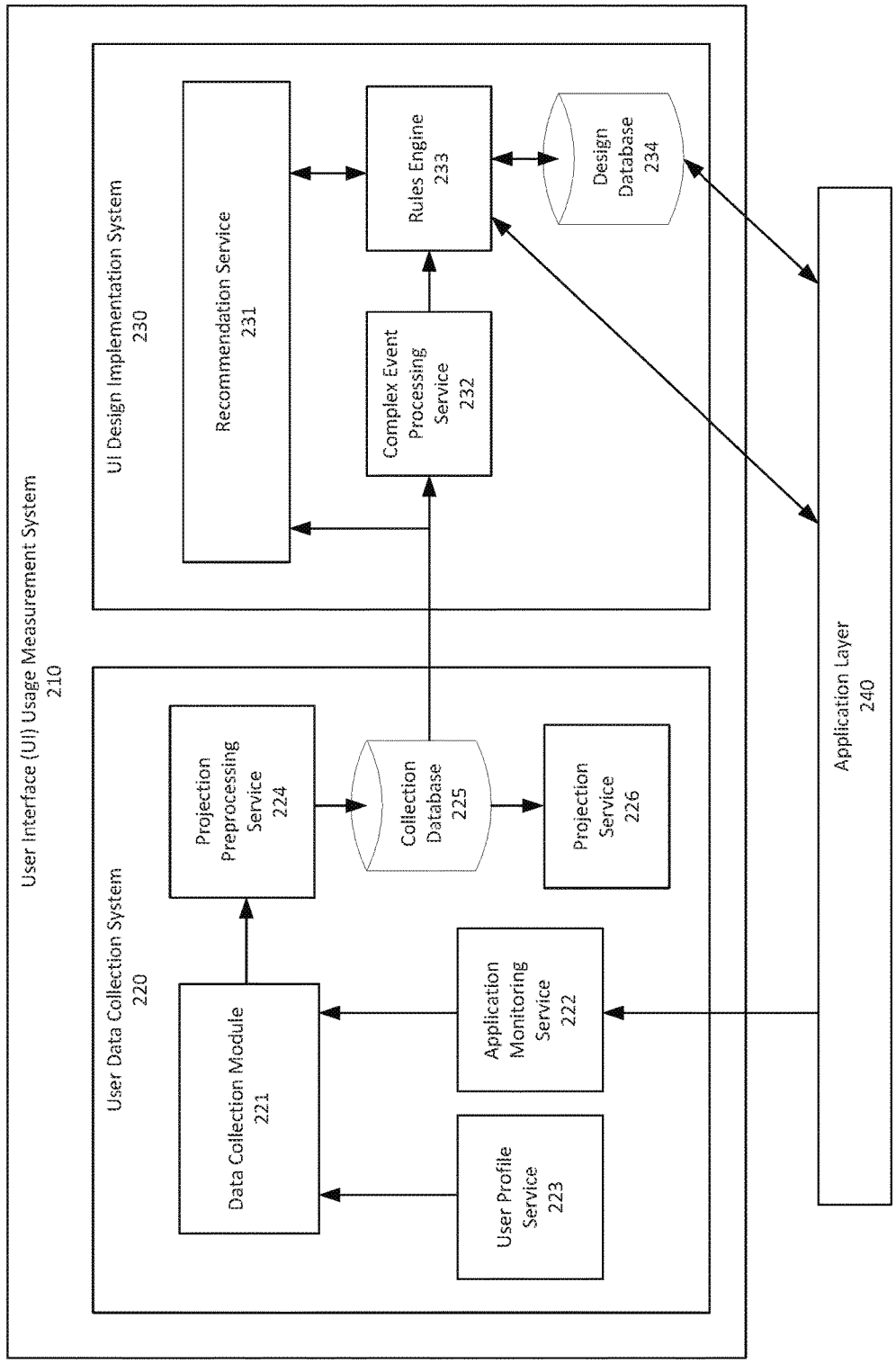
FIG. 2 depicts a block diagram of an environment of a UI usage measurement system interaction with an application layer, according to some embodiments.

To collect interaction data, generate a visualization, and/or generate a recommendation, UI usage measurement system 110 may use an architecture similar to the architecture described with reference to FIG. 2. FIG. 2 depicts a block diagram of an environment 200 of a UI usage measurement system 210 interaction with an application layer 240, according to some embodiments. UI usage measurement system 210 may include user data collection system 220, which may perform operations similar to user data collection system 120 as described with reference to FIG. 1. UI usage measurement system 210 may also include UI design implementation system 230, which may perform operations similar to UI design implementation system 130.

User data collection system 220 may collect user interaction data and/or generate a visualization. The user interaction data may be collected from application 240. User data collection system 220 may use application monitoring service 222 to collect the data. Application monitoring service 222 may be an API configured to communicate with one or more applications executing on application layer 240. Application monitoring service may receive data packets pushed from application layer 240 at periodic time intervals.

In an embodiment, an API, such as a JavaScript, Java, Python, or other API, may be included in the application and may collect the relevant user monitoring data using files. This collected information may include data such as navigation to pages of an application, flow of the usage of features of the application, cursor movements, coordinates of a click or tap, screenshots of pages, identifications of elements clicked or tapped, a timestamp of clicks or taps, Internet addresses of the application, network stack trace details, the resolution and/or zoom of the screen, and/or other user interaction information.

After application monitoring service 222 receives the interaction data, data collection module 221 may analyze the collected information. This analysis may include using information from user profile service 223. User profile service 223 may provide user identification data from a cloud account and/or from a local computer profile account. For example, the user information may include a user name, age, location, persona, authorizations, roles, and/or other user profile information that may be retrieved from a cloud system and/or from a local system. Using this user data may allow data collection module 221 to correlate the received interaction data with user data to identify patterns.

This correlation may aid a particular user based on collected information from the particular user. For example, the pattern recognition may identify idiosyncratic tendencies of a user and suggest a GUI object modification for the user based on the user's past habits. Similarly, data collection module 221 may be able to correlate the received interaction data across multiple users to allow UI design implementation system 230 to identify patterns related to the collected data.

After collecting the interaction information and/or correlating the information with user data, collection module 221 may store the organized information in collection database 225. Collection database 225 may be memory accessible by UI design implementation system 230. In an embodiment, a separate system may access collection database 225 to retrieve the raw data in the form of lists and/or tables. The data may be organized or categorized in various different formats, such as, for example, a list of interactions along with timestamps. This list may include button identifications and/or pixel coordinates.

In an embodiment, after collecting the interaction information and/or correlating the interaction information with user information, data collection module 221 may pass this information to projection preprocessing service 224 prior to storing the information in collection database 225. Projection preprocessing service 224 may modify the resolution and/or zoom of a displayed GUI from which interaction data is captured. Because different users may utilize different display resolutions, projection preprocessing service 224 may normalize the collected data so that interactions may be aligned. For example, a first user device may identify a button press in a certain location. A second user device may also identify the button press but the location information differs on the second user device due to different resolutions and/or zoom settings. Projection preprocessing service 224 may normalize the resolution so that data may be compared to identify the same location information for GUI objects. This normalized information may include coordinate information and may be stored in collection database 225.

Projection preprocessing service 224 may also provide normalized information to projection service 226. Projection service 226 may aid in the generation of a visualization of the collected interaction information. An example of GUIs created by projection service 226 is further discussed with reference to FIGS. 4A-4D. Projection service 226 may provide visualizations of the collected interaction information such as, for example, heat maps, a view of real-time interactions, and/or graphs. These visualizations may be filtered based on a time period specified by a user or administrator seeking to view the collected information. Further, a user or administrator may specify one or more users to display. For example, an administrator may view the interactions of a single user and/or a group of users. The group of users may be individually selected and/or may be selected as a categorized group of users.

A heat map may include color and/or visual cues indicating the frequency of interactions with portions of a GUI view. For example, areas of a GUI having high usage may be designated with a red color while areas of low usage may be green or may not include any color. Projection service 226 may identify these interactions and generate instances of the GUI views with a heat map overlay. In this manner, users may view the colors on top of the GUI view to quickly identify areas with frequent usage. This heat map may aid designers who are developing GUIs.

Similarly, projection service 226 may generate a view of real-time interactions. For example, application monitoring service 222 may track the location of a cursor as well as the paths traveled by a cursor navigating pages of an application using timestamp information. This information may be stored in collection database 225 so that projection service 226 may animate the cursor movement. Similarly, using this information, projection service 226 may provide animated heat maps to show the usage of areas of the GUI over time.

Projection service 226 may also generate graphs using the collected interaction information. The graphs may represent usage statistics and/or indicate the navigation time spent to arrive at a particular GUI object. Users may specify the particular graph visualization based on the desires of the user.

After information has been collected in collection database 225, UI design implementation system 230 may retrieve the collected interaction information to generate a GUI object recommendation. Recommendation service 231 and complex event processing service 232 may utilize the interaction information.

Recommendation service 231 may include a pre-processor depending on the format of the stored data and/or the type of machine learning techniques employed. For example, recommendation service 231 may retrieve data in a raw format and may apply techniques such as data cleansing using regression substitution, data normalization using a min-max or other technique, data reduction, and/or data discretization. This pre-processing may place data into a format usable by recommendation service 231 to perform machine learning predictions.

Recommendation service 231 may use predictive analytics techniques in conjunction with complex event processing service 232 and rules engine 233 to provide a recommendation to the user. The one or more recommendations may be ranked. This recommendation may occur based on a comparison of interaction data collected from other similar users.

Recommendation service 231 may categorize users based on user attributes. These user attributes may be, for example, age, persona, demographic, authorizations, and/or roles. Recommendation service 231 may use a neighborhood approach as a machine learning technique. Recommendation service 231 may identify the most similar set of users for every user. Recommendation service 231 may identify a practice that most users are using and use that practice as a recommendation to users not employing that practice.

To illustrate an example, UI usage measurement system 210 may monitor "m" users of a particular application. Each user may include "n" attributes. Recommendation service 231 may construct a matrix having "m" by "n" dimensions. Recommendation service 231 may populate the $i^{th}$ row and $j^{th}$ column for every user and attribute.

Recommendation service 231 may use a distance metric such as a cosine similarity to rate the interactions. The ratings may be vectors in n-dimensional space. The similarity may be calculated based on the angle between the vectors. Cosine similarity for users "a" and "k" may be calculated using the formula below. This formula may use the dot product of a user vector $u_k$ and the user vector $u_a$ and divide the dot product by the multiplication of the Euclidean lengths of the vectors.

$$S_u^{cos}(u_k, u_a) = \frac{u_k \cdot u_a}{\|u_k\|\|u_a\|}$$

Using this operation, recommendation service 231 may compute a cosine similarity for every user with every other user. Recommendation service 231 may then select the top N most similar users for each user. This N value may be preset and may represent the nearest neighbor. Recommendation service 231 may then recommend the best practice used by those grouped by nearest neighbor to other users that do not use the best practice. The best practice, for example, may be the movement of a particular GUI object from one location to another.

While recommendation service 231 may use the cosine similarity to identify relevant users, recommendation service 231 may also use other techniques such as factorization machines, user similarity coefficients, and/or deep learning mechanisms to identify and group users.

In addition to the processing performed by recommendation service 231, complex event processing service 232 may aid in the analysis of the data and in generating a recommendation. Complex event processing service 232 may analyze and/or aggregate user interactions, events, and/or patterns. Complex event processing service 232 detects patterns, performs event abstraction, event aggregation, filtering, modeling, and/or other processing to identify interaction patterns. These patterns may include the number of clicks to reach a desired GUI object and/or the amount of time spent on a particular page. Complex event processing service 232 may identify these actions based on timestamps and/or interactions. For example, an interaction may be punctuated when a long gap of time is identified by complex event processing service 232. A long gap of time may indicate that a user has reached a desired page or interaction and is now viewing the desired data. Complex event processing service 232 may identify these patterns using machine learning techniques. Complex event processing service 232 may then pass this information to rules engine 233.

Rules engine 233 aids in formulating the recommendation based on the received information from recommendation service 231 and complex event processing service 232. Rules engine 233 may identify interactions from users grouped in a cluster over a period of time. Rules engine 233 may count the number of interactions performed by a user over the period of time to determine an average frequency of interactions performed by one or more users. Using this information, rules engine 233 may dynamically set a threshold for the number of interactions performed by the user to reach a particular GUI object. This threshold may be dynamically adjusted over time.

Rules engine 233 may accrue summary statistics over a predetermined time period indicating the number of interactions performed by a user. If the number of interactions exceeds the threshold, rules engine 233 sends a recommendation notification to the user via the application in application layer 240. The recommendation may be a prompt suggesting an alternative GUI object location to aid in improving the efficiency of the user.

Rules engine 233 may initiate a prompt requesting that the user accept the modification. This prompt may be a text prompt or an audio prompt. If the user accepts the modification, application layer 240 may transmit the acceptance to rules engine 233. Acceptance may be an interaction with a visual prompt and/or a voice commanded acceptance. In response to the acceptance, rules engine 233 may then modify the GUI pages seen by the user. Rules engine 233 may also store this configuration in design database 234. Design database 234 may store GUI data indicating a user's preferences and/or modifications. Design database 234 may be integrated with a cloud computing account and/or profile for a user. The stored configuration information may be persistent and may be retrieved when a user access an application. While this data may persist, the user may be provided with an option to restore default GUI layouts and/or settings.

Figure 3A:
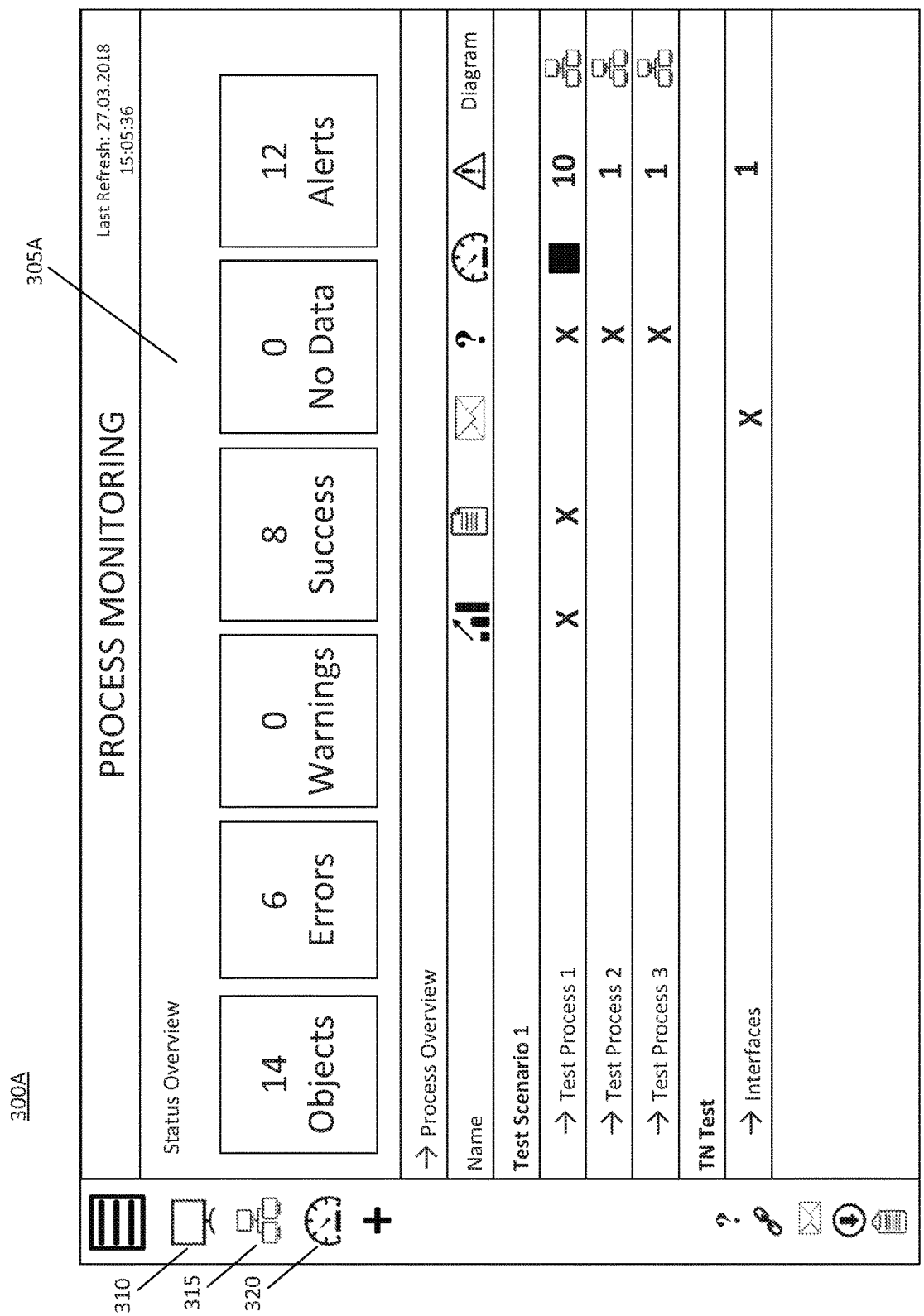
FIG. 3A depicts a block diagram of a graphical user interface (GUI) displaying a first page of an application, according to some embodiments.

To illustrate a flow for this GUI interaction, FIGS. 3A-3F depict GUI changes based on monitoring of a user's interactions as well as a recommendation provided by user data collection system 220. FIG. 3A depicts a block diagram of a GUI 300A displaying a first page of an application, according to some embodiments. An application may instantiate GUI 300A so that it may be view on a user device. When a user accesses the application, the user may view GUI 300A. The application may be a software program, Internet address, and/or software hosted in a distributed platform, such as, for example, cloud-based computing.

GUI 300A may include a first page 305A. First page 305A may include a portion of GUI 300A representing GUI data objects based on the configuration of the application. In an embodiment, first page 305A may include status overview information for process monitoring and testing.

GUI 300A may include other navigation buttons such as first page button 310, second page button 315, and third page button 320. Page buttons 310, 315, and 320 may allow a user to navigate to different pages of the application. Page buttons 310, 315, and 320 may persist outside of first page 305A such that page buttons 310, 315, and 320 remain visible on GUI 300A even when a user navigates to a different page or when a user interacts with a data object located on first page 305A. First page button 310 may correspond to first page 305A. When a user selects first page button 310, the application may retrieve GUI 300A and display first page 305A.

Figure 3B:
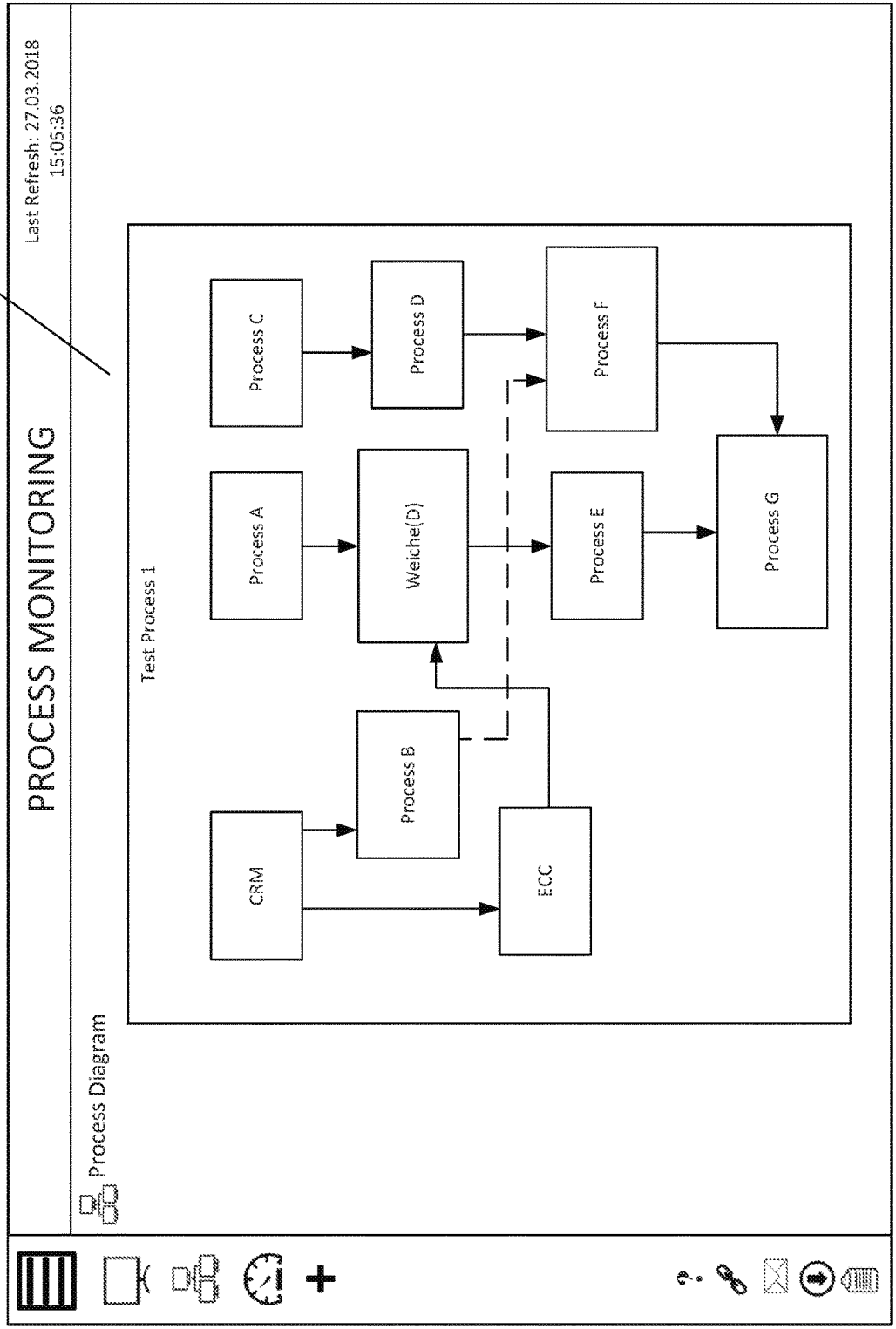
FIG. 3B depicts a block diagram of a GUI displaying a second page of the application, according to some embodiments.

When a user selects second page button 315, the application may retrieve GUI 300B and display second page 305B as depicted in FIG. 3B. When a user selects third page button 320, the application may retrieve GUI 300C and display second page 305C as depicted in FIG. 3C. Using page buttons 310, 315, and 320, a user may navigate to different pages of the application. Page buttons 310, 315, and 320 may persist during this navigation and may be visible even if the page display changing between first page 305A, second page 305B, and third page 305C changes.

Third page 305C may include a target button 325. Target button 325 may represent a user desired button. As shown in FIG. 3D, target button 325 may be a menu with a first menu button 330 and a second menu button 335. Interacting with target button 325 may cause first menu button 330 and second menu button 335 to become visible. A user may navigate through multiple pages to arrive at target button 325.

For example, a user viewing first page 305A may navigate to third page 305C to view and/or interact with target button 325. In an embodiment, a user may be required to navigate from first page 305A to second page 305B and from second page 305B to third page 305C.

Based on the monitoring of this interaction, UI usage measurement system 110 may detect that the GUI object off target button 325 may be moved. UI usage measurement system 110 may identify the number of clicks or taps through the pages and identify the decreased efficiency for a user that frequently uses target button 325. UI usage measurement system 110 may also compare information for other users to determine that moving target button 325 would reduce the number of interactions required before accessing target button 325. Based on the machine learning analysis performed by UI usage measurement system 110, UI usage measurement system 110 may present a recommendation to the user via the GUI.

Figure 3E:
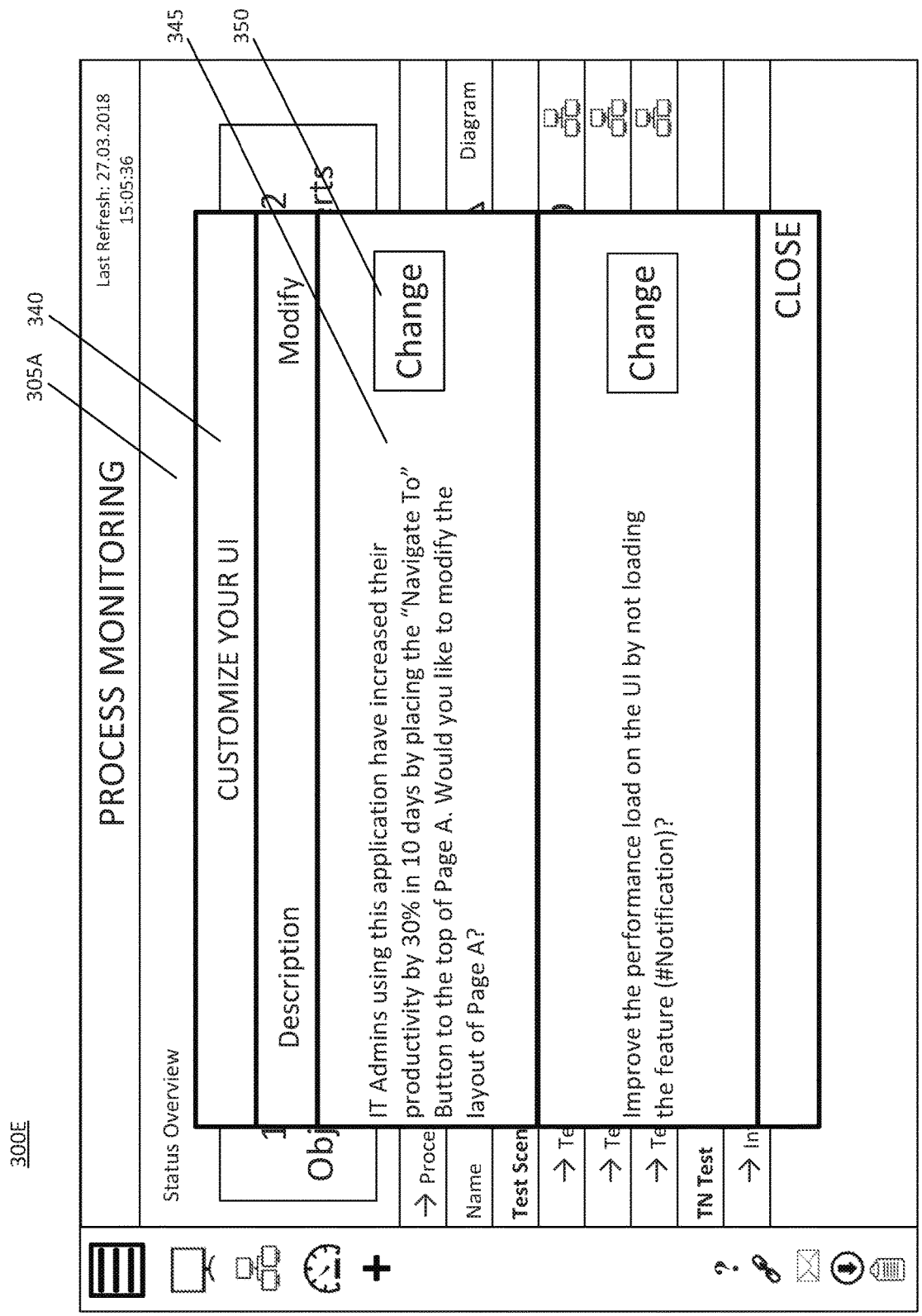
FIG. 3E depicts a block diagram of a GUI displaying a recommendation prompt, according to some embodiments.

For example, as shown in FIG. 3E, UI usage measurement system 110 may generate GUI 300E and a prompt 340 to provide the recommendation to the user. Although prompt 340 is depicted over first page 305A, prompt 340 may be located on any page. Prompt 340 may include the text of a recommendation 345 and/or an accept button 350 to signal the change.

In an embodiment, the text recommendation may state that moving target button 325 from third page 305C to first page 305A may increase productivity. The move may reduce the number of interactions, clicks, and/or taps before reaching target button 325. For example, first page 305A may be a home page or a launch pad page that may appear when the application is accessed. Moving target button 325 to first page 305A may allow the user to access target button 325 more quickly. Using machine learning techniques, UI usage measurement system 110 may determine the recommendation based on the frequency of interactions with target button 325 and/or using other user information compiled from other users to provide the recommendation.

Figure 3F:
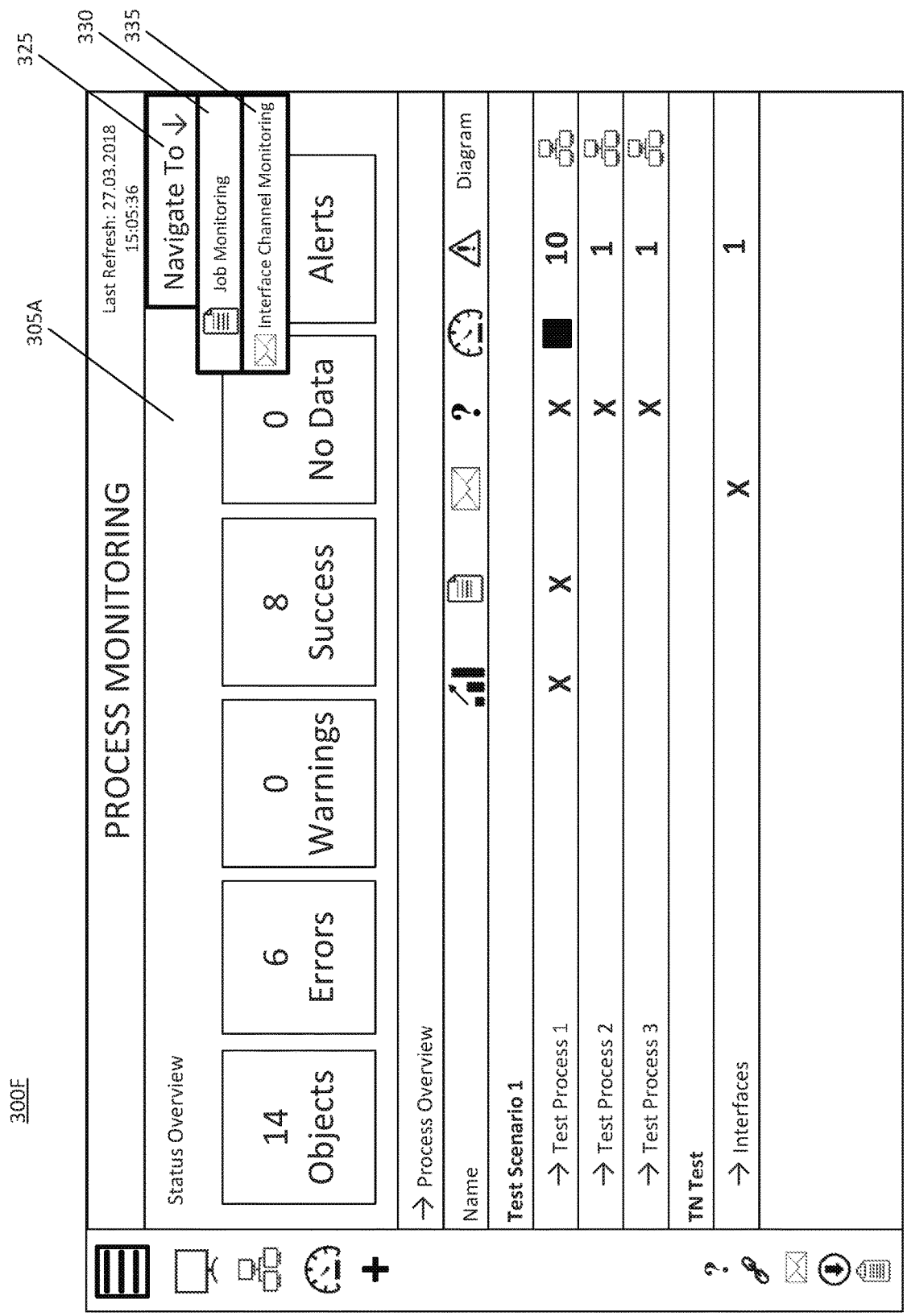
FIG. 3F depicts a block diagram of a GUI displaying the first page of the application with the button interaction, according to some embodiments.

Prompt 340 may display the recommendation text 345 generated by UI usage measurement system 110. If the user selects to accept the change using accept button 350, UI usage measurement system 110 may perform the change to first page 305A. As seen in FIG. 3F, first page 205A may be modified to include target button 325. Further, the modification may also move the collapsed GUI objects including first menu button 330 and second menu button 335 to first page 305A. UI usage measurement system 110 may save or record this configuration for the particular user so that the configuration appears when the user accesses the application. In this manner, UI usage measurement system 110 may generate unique GUI views of an application for different users.

Figure 4A:
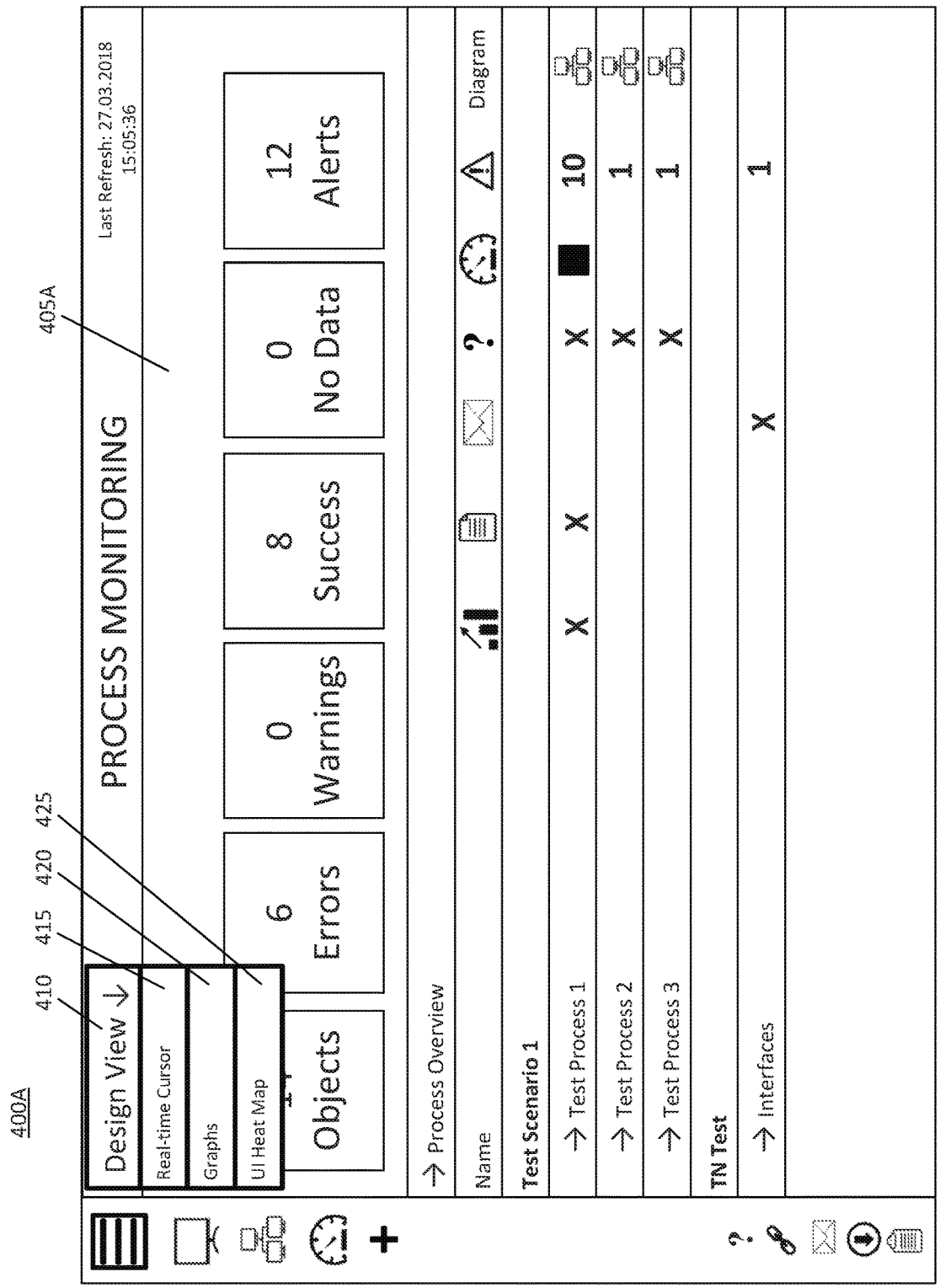
FIG. 4A depicts a block diagram of a GUI displaying a developer menu, according to some embodiments.

In addition to generating a recommendation and altering GUI objects for users, UI usage measurement system 110 may provide GUI representations for designers. FIG. 4A depicts a block diagram of a GUI 400A displaying a developer menu 410, according to some embodiments. GUI 400A may depict a first page 405A which may be similar to first page 305A. A developer or designer may use GUI 400A to visualize interactions with GUI views of an application. This viewing may aid in the development of the GUIs.

To begin the visualization of the collected interactions, developer menu 410 may provide options including a real-time button 415, graph button 420, and/or heat map button 425. These buttons may be used to generate different visualizations of the interaction information.

Figure 4B:
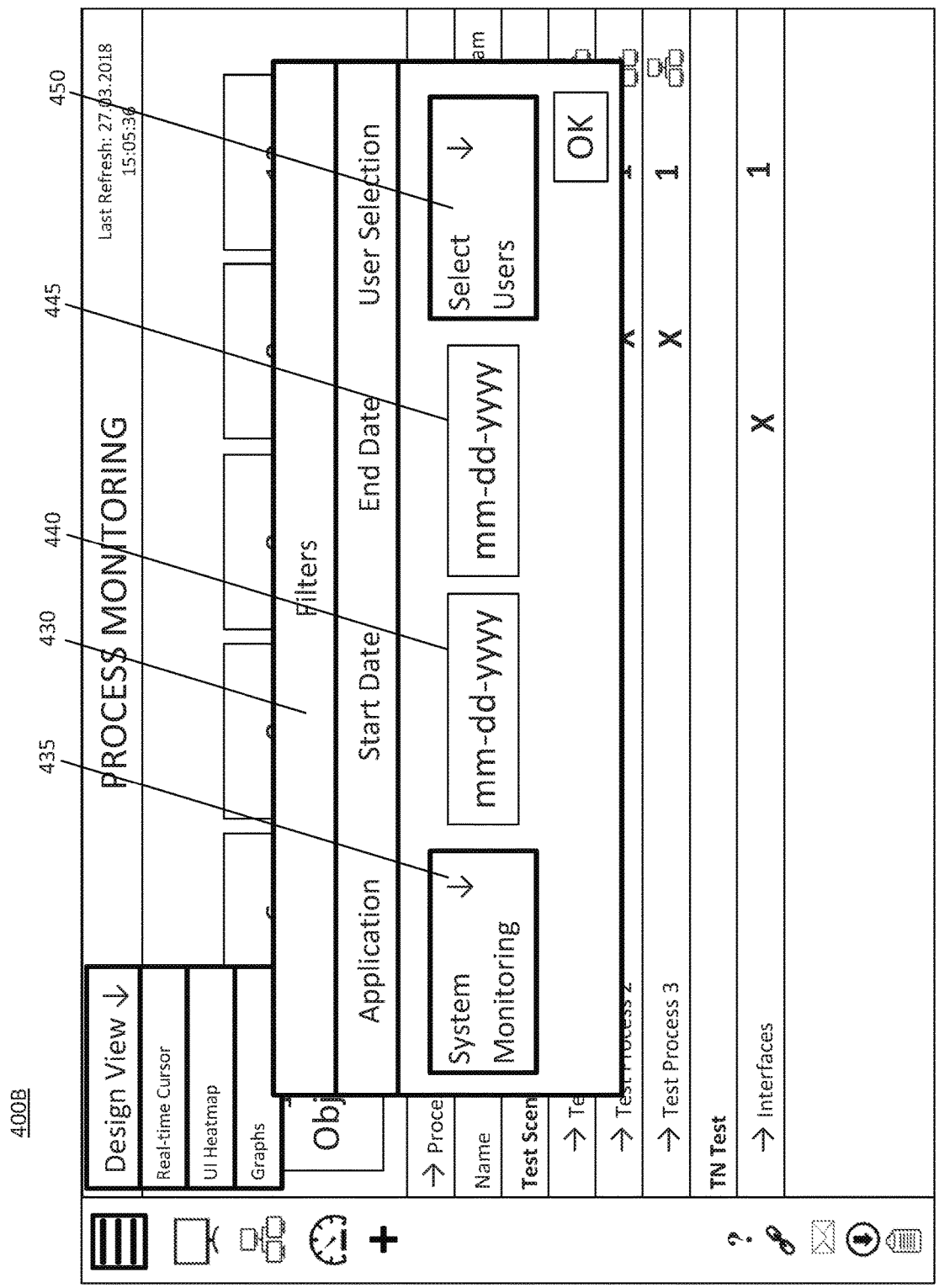
FIG. 4B depicts a block diagram of a GUI displaying filter menu, according to some embodiments.
Figure 4C:
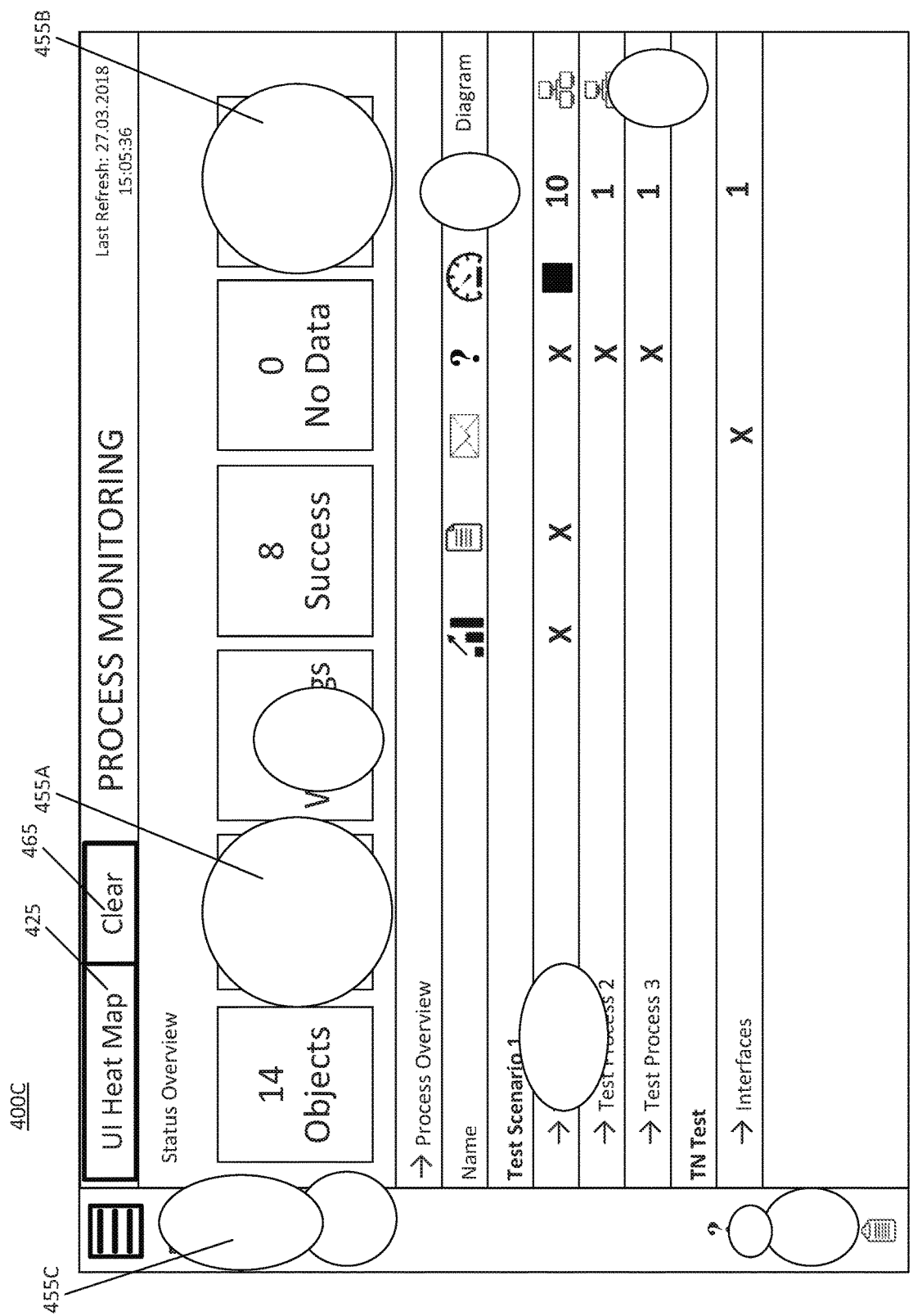
FIG. 4C depicts a block diagram of a GUI displaying a heat map, according to some embodiments.

For example, using heat map button 425, a developer may generate a heat map to view the interactions. A heat map may include color and/or visual cues indicating the frequency of interactions with portions of a GUI view. FIG. 4C depicts an example embodiment of a GUI 400C displaying a heat map over first page 405A.

To view the heat map, a developer may select heat map button 425. In response to the selection, UI usage measurement system 110 may display GUI 400B as depicted in FIG. 4B. GUI 400B may display a command interface 430. While command interface 430 is described with respect to heat maps, command interface 430 may be used for displaying real-time interactions and/or graphs as well.

Command interface 430 may include selection button 435. Selection button 435 may allow a user to specify an application and/or a particular page to view. Selection button 435 may include a drop down menu and/or may allow a user to input a page identifier. This selection may indicate the desired page for which the user seeks to view the heat map overlay.

Command interface 430 may also include a starting time button 440 and/or an ending time button 445. Starting time button 440 and/or ending time button 445 may allow a user to specify a time period to view the interaction information. This time period may be specified from times including seconds, minutes, hours, days, weeks, and/or a specific date range. The times may be selected from a separate interface and/or may be input by the user. In an embodiment, the times may not require specification and UI usage measurement system 110 may display any collected interaction data.

Command interface 430 may also include user button 450. User button 450 may allow a user to specify one or more users. In generating the heat map, real-time interactions, and/or graphs, UI usage measurement system 110 may filter the data based on the users specified. A user using command interface 430 may specify particular users and/or a group of users. This group may correspond to a particular user characteristic, such as, for example, an occupational title or a user organization. Selecting user button 450 may display a prompt to allow the selection of the particular users. The prompt may receive user names and/or user numbers.

If the user has selected heat map button 425 and after supplying information to command interface 430, UI usage measurement system 110 may generate GUI 400C as depicted in FIG. 4C. GUI 400C may include heat map button 425 indicating that the view is a heat map. Interacting with this button may toggle the heat map view, showing and/or hiding the heat map portions. GUI 400C may also include clear button 465. Interacting with clear button 465 may close the heat map display and/or may return the user to GUI 400A to select another visualization option.

GUI 400C illustrates a black and white view of a heat map with heat map portions 455. In an embodiment, the heat map may be colored and/or may vary with visual indicators demonstrating frequencies of interaction. For example, heat map portions 455 having high usage may be designated with a red color while areas of low usage may be green or may not include any color. The heat map portions 455 may vary in color or size depending on frequency of interaction on the particular page. Users may view the visualized version of these interactions to determine areas that include frequent interactions and areas with less frequent interactions. This heat map may aid designers who are developing GUIs.

Figure 4D:
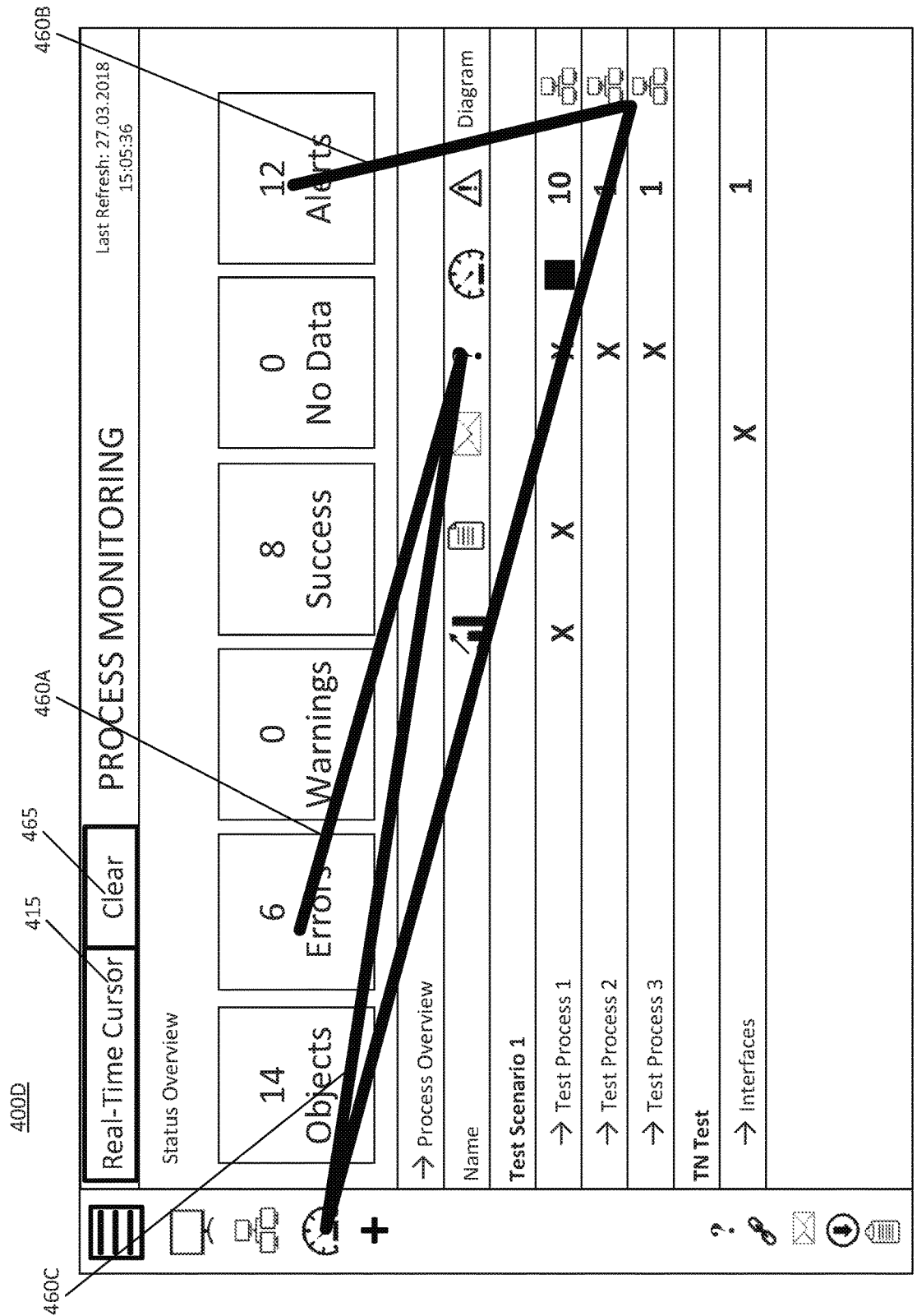
FIG. 4D depicts a block diagram of a GUI displaying real-time cursor interactions, according to some embodiments.

Similar to GUI 400C, if a developer selects real-time button 415, UI usage measurement system 110 may generate a view of real-time interactions with GUI 400D. An example embodiment, of real-time interactions is depicted in FIG. 4D. FIG. 4D depicts a block diagram of a GUI 400D displaying real-time cursor interactions, according to some embodiments. Similar to the scenario where a user selects heat map button 425, when a user selects real-time button 415, UI usage measurement system 110 may supply command interface 430 to allow filtering of the desired information. A user may then supply information to command interface 430 to view real-time cursor interactions based on the information gathered by UI usage measurement system 110.

UI usage measurement system 110 may track the location of a cursor as well as the paths 460 traveled by a cursor navigating pages of an application using timestamp information. UI usage measurement system 110 may utilize this information to animate the cursor movement. UI usage measurement system 110 may also depict click and/or tap interactions on the particular GUI or first page 405A. As an overlay, a developer may view the real-time interactions. The animations may be generated as paths 460 and may mimic a GUI vector traversed by a cursor, changes in direction of a cursor, and/or clicks from the cursor. In an embodiment, a user may decide to overlay both GUI 400C and GUI 400D to simultaneously view the heat map visualization with the real-time cursor interaction.

GUI 400D may also include clear button 465. Interacting with clear button 465 may close the real-time interaction display and/or may return the user to GUI 400A to select another visualization option.

A developer may also select graph button 420 to generate a graph using the collected interaction information. The graphs may represent usage statistics and/or indicate the navigation time spent to arrive at a particular GUI object. Users may specify the particular graph visualization based on the desires of the user. the graphs may be filtered based on a time period specified by a user or administrator seeking to view the collected information.

Figure 5:
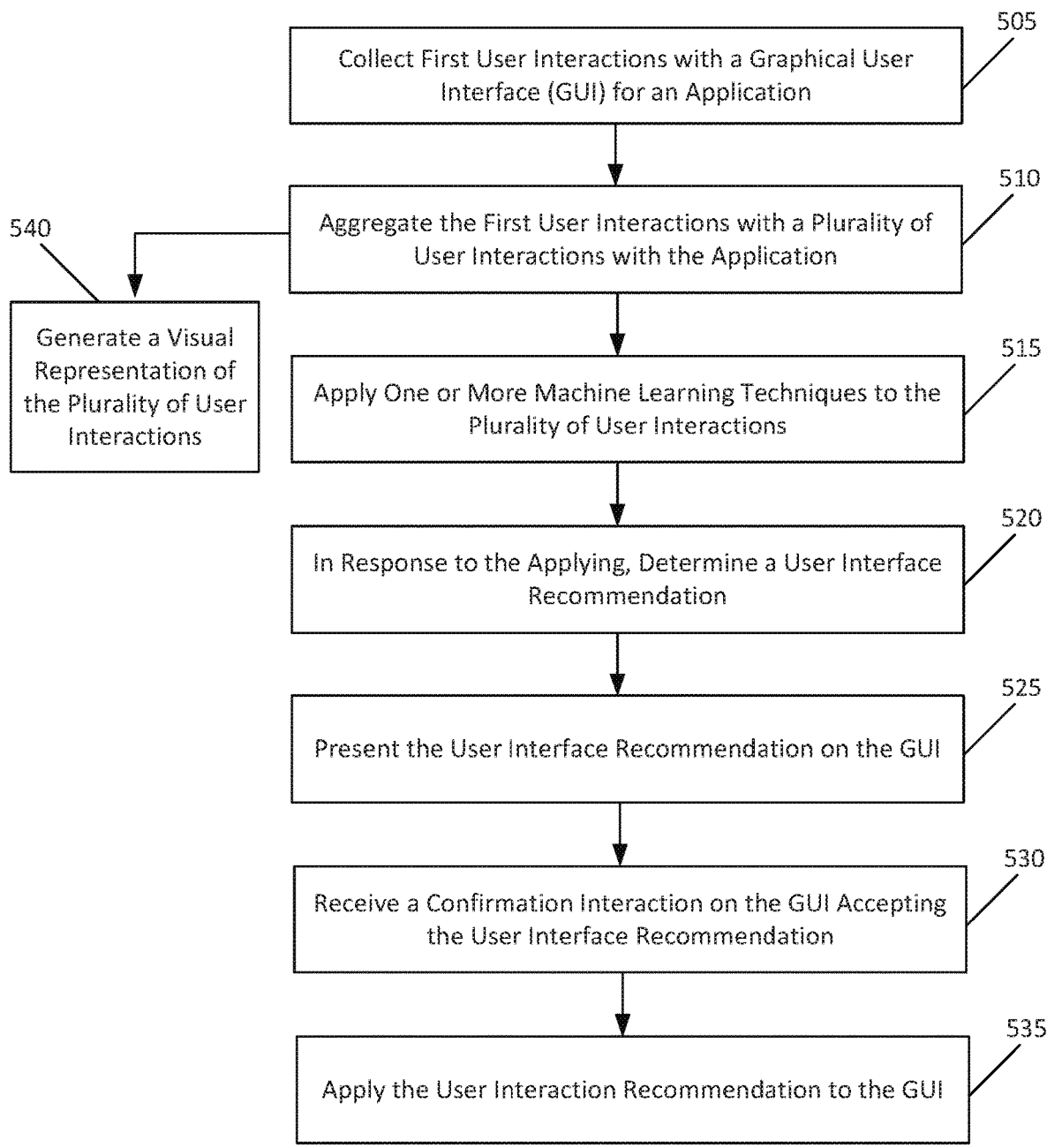
FIG. 5 depicts a flowchart illustrating a method for measuring UI usage, according to some embodiments.

FIG. 5 depicts a flowchart illustrating a method 500 for measuring UI usage, according to some embodiments. Method 500 shall be described with reference to FIG. 1, however, method 500 is not limited to that example embodiment.

In an embodiment, UI usage measurement system 110 may utilize method 500 to measure UI usage, generate a visualization of the UI usage, and/or generate a GUI object recommendation based on the measured UI usage. The foregoing description will describe an embodiment of the execution of method 500 with respect to UI usage measurement system 110. While method 500 is described with reference to UI usage measurement system 110, method 500 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

In an embodiment, at 505, UI usage measurement system 110 may collect first user interactions with a GUI for an application. UI usage measurement system 110 may query application layer 140 executing an application. A user device may be using the application, navigating through pages of the application, and/or interacting with elements of the application via interactions with various GUI views of the application. UI usage measurement system 110 monitor these interactions and/or store information related to the interactions. In an embodiment, the application may use an API to deliver the interaction data to UI usage measurement system 110 at periodic intervals. In this manner, UI usage measurement system 110 may collect interactions from a first user related to how the first user interacts with the one or more GUI pages of the application.

In an embodiment, UI usage measurement system 110 and/or application layer 140 may be portions of a cloud computing platform accessible by user device 150. In this manner, UI usage measurement system 110 and the application may share hardware and/or software components. These components may communicate to monitor the user interactions with displayed GUI objects.

At 510, UI usage measurement system 110 may aggregate the first user interactions with a plurality of user interactions with the application. This aggregation may aggregate the first user interactions with previous interactions performed by the same particular user and/or may aggregate the first user interactions with interactions from other users. In this manner, UI usage measurement system 110 may organize the interaction data and/or categorize interaction data. This organization may be based on user accounts and/or cloud profiles. UI usage measurement system 110 may also organize the interaction data based on user attributes. The user attributes may be, for example, user name, user age, user location, user persona, and/or user authorizations or roles. Aggregate the information based on these groupings may allow UI usage measurement system 110 to detect patterns of usage.

At 540, UI usage measurement system 110 may generate a visual representation of the plurality of user interactions. The visual representation may include real-time cursor interactions, a heat map, and/or graphs. Users may specify time periods desired and/or may specify particular users or groups of users to view. This visualization may be an overlay on top of a GUI page view so that a developer may view GUI areas based on frequency of usage.

At 515, UI usage measurement system 110 may apply one or more machine learning techniques to the plurality of user interactions with the application. These machine learning techniques were described with reference to FIG. 2. In an embodiment, UI usage measurement system 110 may utilize a nearest neighbor technique to identify similar users. UI usage measurement system 110 may then identify the types of interactions performed by the common users using complex event processing, such as event abstraction, event aggregation, filtering, modeling, and/or other processing to identify interaction patterns. This analysis and pattern recognition may aid in identifying superfluous multiple interactions before reaching a target GUI object such as a button or data. UI usage measurement system 110 may seek to reduce the number of interactions depending on predetermined settings and/or suggestions determined via the machine learning comparisons. UI usage measurement system 110 may also utilize thresholds before applying a suggestion. For example, before generating a recommendation, UI usage measurement system 110 may set a threshold of interactions required before reaching a target GUI object.

At 520, in response to applying the machine learning techniques, UI usage measurement system 110 may determine a user interface recommendation. This recommendation may identify a new location for a GUI object. This new location may differ from a default location for the GUI object based on default settings for the application. The new location may be a different location on the same page or a different location on a different page. The new location may reduce the number of interactions a user must use before reaching a target GUI object.

At 525, UI usage measurement system 110 may present the user interface recommendation on the GUI being displayed on a user device 150. The user interface recommendation may be a text box prompt with a button allowing the user to accept the recommendation. In an embodiment, the user interface recommendation may be presented to the user via an audio prompt depending on the configuration of UI usage measurement system 110. The audio prompt may be played and may be configured to receive audio confirmation data from the user device 150. The user interface recommendation may be presented through the application executing in application layer 140 and/or may be presented as an overlay. For example, if UI usage measurement system 110 is executing on a cloud computing platform, the cloud computing platform may present the user interface recommendation while the user is interacting with the application.

At 530, UI usage measurement system 110 may receive a confirmation interaction on the GUI accepting the user interface recommendation. For example, a user may interact with a button displayed on the GUI to accept the recommendation to move the target GUI button. Similarly, the user may provide an audio response which may change display of the GUI.

At 535, UI usage measurement system 110 may apply the user interaction recommendation to the GUI. For example, UI usage measurement system 110 may move a GUI object from a second page to a first page. Similarly, UI usage measurement system 110 may move the GUI object from a first location on a page to a second location on the page. UI usage measurement system 110 may save this configuration for the user according to a user account or cloud profile. For example, different users may use different configurations for different GUI objects depending on how the users interact with the application. For example, some users may move the GUI object to the first page while other users may not receive a movement recommendation and may keep the GUI object in the default position.

UI usage measurement system 110 may manage these different configurations for different users. In this manner, even if different users utilize the application, UI usage measurement system 110 may apply the configuration particular to the accessing user so that the user may view GUI pages of the application and navigate through the pages efficiently. As previously discussed, this configuration may aid in situations where different user occupational titles may indicate the frequent usage of certain GUI objects while indicating infrequent usages of other GUI objects. Based on the aforementioned characterization, UI usage measurement system 110 may tailor and/or customize GUI views of a common application for different users using the recommendation process.

Figure 6:
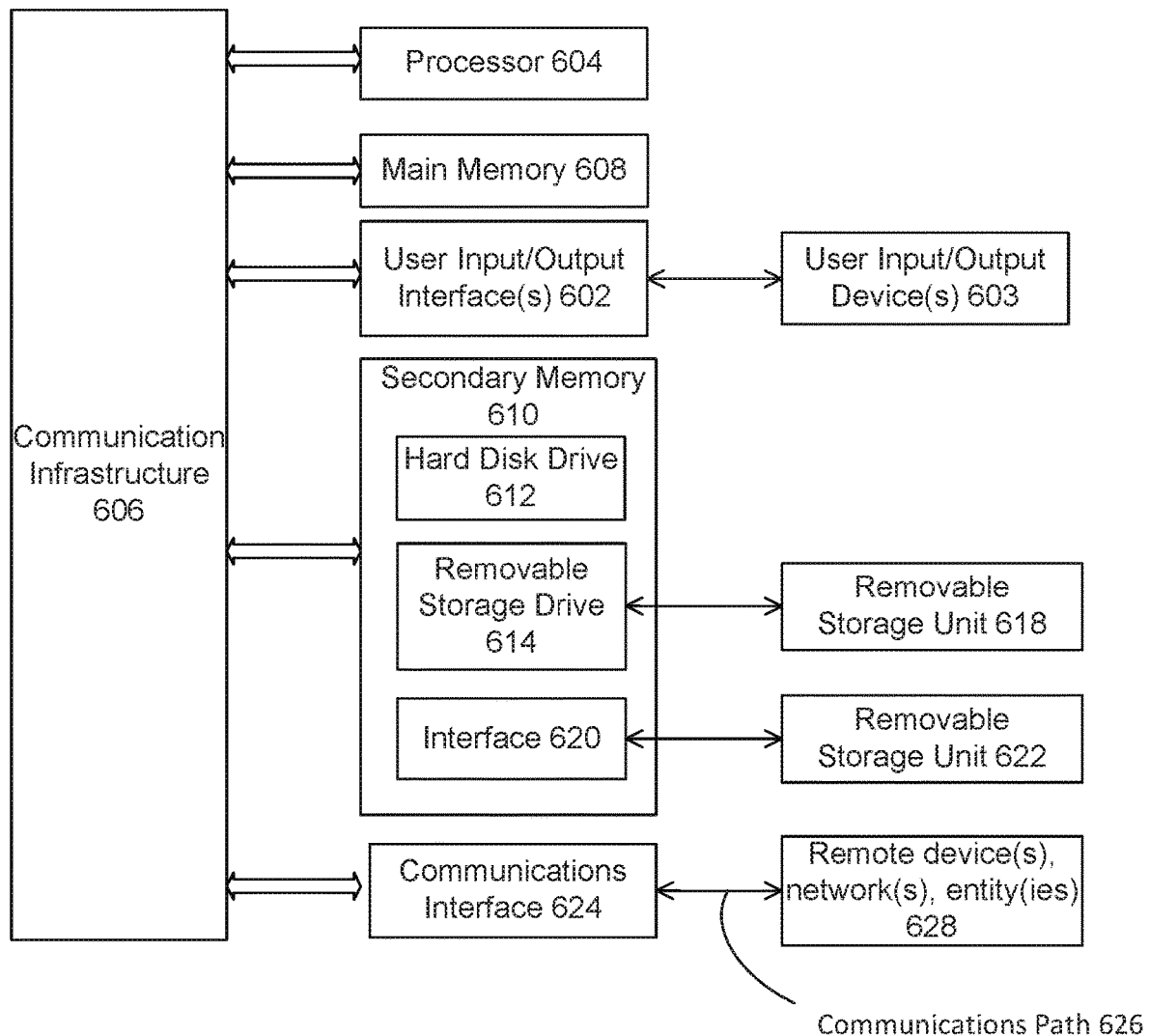
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a plurality of user interactions with a graphical user interface (GUI) for an application, including a number of interactions required to reach a GUI object from a first page of the application, wherein the application comprises a plurality of pages, and wherein the GUI object is initially displayed on a second page of the application;

grouping the user interactions based on a cosine similarity between a plurality of users associated with performing one or more of the user interactions;

applying one or more machine learning techniques to the grouped plurality of user interactions to identify a GUI usage pattern;

in response to the applying, determining a GUI recommendation moving the GUI object from a first GUI location on the second page to a second GUI location to a different one of the plurality of pages of the application, wherein the number of interactions required to reach the GUI object from the first page is reduced; and generating a GUI prompt appearing on the GUI presenting a text version of the GUI recommendation to at least one of the plurality of users whose interactions are not associated with the grouped plurality of user interactions.

2. The computer-implemented method of claim 1, further comprising:
receiving an acceptance interaction on the GUI prompt;
in response to the receiving, modifying the GUI by moving the GUI object from the first location to the second GUI location; and
storing a record of the acceptance interaction.

3. The computer-implemented method of claim 1, further comprising:
in response to the generating, receiving an audio acceptance interaction;
in response to the receiving, modifying the GUI by moving the GUI object from the first location to the second GUI location; and
storing a record of the acceptance interaction.

4. The computer-implemented method of claim 1, further comprising:
generating a visualization GUI depicting the plurality of user interactions.

5. The computer-implemented method of claim 1, wherein the receiving further comprises:
receiving the plurality of user interactions from an application executing on a cloud computing platform.

6. The computer-implemented method of claim 1, wherein the receiving further comprises:
receiving the plurality of user interactions from multiple users accessing a common application.

7. The computer-implemented method of claim 1, wherein the applying further comprises:
categorizing the plurality of user interactions by grouping a subset of the plurality of user interactions by a common user profile characteristic.

8. The computer-implemented method of claim 1, wherein the first GUI location is located on a first page of the application and the second GUI location is located on a second page of the application.

9. The computer-implemented method of claim 1, further comprising:
playing an audio prompt version of the GUI recommendation; and
receiving, from a user, an audio response to the audio version of the GUI recommendation.

10. The computer-implemented method of claim 1, further comprises:
determining that a usage of the GUI object is below a threshold, wherein the GUI recommendation comprises not loading the GUI object based on usage being below the threshold.

11. The computer-implemented method of claim 1, further comprising:
identifying a role corresponding to one or more users associated with performing the plurality of user interactions, wherein users corresponding to a plurality of different roles interacts with the GUI; and
moving the GUI object from the first GUI location on the second page to a second GUI location to the different one of the plurality of pages of the application.

12. The computer-implemented method of claim 1, wherein the different page is an extension of the first page.

13. A system, comprising:
a memory; and
at least one processor coupled to the memory, the at least one processor configured to:
receive a plurality of user interactions with a graphical user interface (GUI) for an application, including a number of interactions required to reach a GUI object from a first page of the application, wherein the application comprises a plurality of pages, and wherein the GUI object is initially displayed on a second page of the application;
group the user interactions based on a cosine similarity between a plurality of users associated with performing one or more of the user interactions;
apply one or more machine learning techniques to the grouped plurality of user interactions to identify a GUI usage pattern;
in response to the applying, determining a GUI recommendation moving the GUI object from a first GUI location on the second page to a second GUI location to a different one of the plurality of pages of the application, wherein the number of interactions required to reach the GUI object from the first page is reduced; and
generate a GUI prompt appearing on the GUI presenting a text version of the GUI recommendation to at least one of the plurality of users whose interactions are not associated with the grouped plurality of user interactions.

14. The system of claim 13, wherein the at least one processor is further configured to:
receive an acceptance interaction on the GUI prompt;
in response to the receiving, modify the GUI by moving the GUI object from the first location to the second GUI location; and
store a record of the acceptance interaction.

15. The system of claim 13, wherein the at least one processor is further configured to:
in response to the generating, receive an audio acceptance interaction;
in response to the receiving, modify the GUI by moving the GUI object from the first location to the second GUI location; and
store a record of the acceptance interaction.

16. The system of claim 13, wherein the at least one processor is further configured to:
generate a visualization GUI depicting the plurality of user interactions.

17. The system of claim 13, wherein to receive the plurality of user interactions, the at least one processor is further configured to:
receive the plurality of user interactions from an application executing on a cloud computing platform.

18. The system of claim 13, wherein to apply the one or more machine learning techniques, the at least one processor is further configured to:

categorize the plurality of user interactions by grouping a subset of the plurality of user interactions by a common user profile characteristic.

19. The system of claim 13, wherein the at least one processor is further configured to:
play an audio prompt version of the GUI recommendation; and
receiving, from a user, an audio response to the audio version of the GUI recommendation.

20. A non-transitory computer-readable device having instructions stored thereon that, when executed by at least one computing device, cause the at least one computing device to perform operations comprising:
receiving a plurality of user interactions with a graphical user interface (GUI) for an application, including a number of interactions required to reach a GUI object from a first page of the application, wherein the application comprises a plurality of pages, and wherein the GUI object is initially displayed on a second page of the application;
grouping the user interactions based on a cosine similarity between a plurality of users associated with performing one or more of the user interactions;
applying one or more machine learning techniques to the grouped plurality of user interactions to identify a GUI usage pattern;
in response to the applying, determining a GUI recommendation moving the GUI object from a first GUI location on the second page to a second GUI location to a different one of the plurality of pages of the application, wherein the number of interactions required to reach the GUI object from the first page is reduced; and
generating a GUI prompt appearing on the GUI presenting a text version of the GUI recommendation to at least one of the plurality of users whose interactions are not associated with the grouped plurality of user interactions.

* * * * *